United States Patent [19]

Johnson

[11] 4,308,087

[45] Dec. 29, 1981

[54] SLIT SEALING APPARATUS

[76] Inventor: James R. Johnson, 3819 Greenhill Dr., Chamblee, Ga. 30341

[21] Appl. No.: 118,499

[22] Filed: Feb. 4, 1980

[51] Int. Cl.[3] ........................ B32B 31/18; B32B 31/26

[52] U.S. Cl. .................................... 156/510; 156/271; 156/308.4; 156/497; 156/499; 156/582; 493/192; 493/197

[58] Field of Search ............... 156/251, 271, 499, 497, 156/510, 515, 82, 250, 285, 308.4, 582; 493/192, 191, 197, 341, 369

[56] References Cited

U.S. PATENT DOCUMENTS

| | | | |
|---|---|---|---|
| 2,474,035 | 6/1949 | Crandon | 156/285 |
| 2,990,875 | 7/1961 | Samuels et al. | 156/251 |
| 3,486,955 | 12/1969 | Päbo | 156/251 |
| 3,772,112 | 11/1973 | Lyons et al. | 156/251 |
| 3,811,984 | 5/1974 | Joonase | 156/251 |
| 3,884,746 | 5/1975 | Löliger | 156/499 |
| 4,070,222 | 1/1978 | Olson | 156/251 |

*Primary Examiner*—Michael G. Wityshyn
*Attorney, Agent, or Firm*—James B. Middleton

[57] ABSTRACT

A method for dividing an extruded tube into a plurality of smaller tubes is disclosed. The method includes the steps of flattening the tube into a web, sealing one or more longitudinal strips, or paths, along the web, and cutting generally the middle of the paths to separate the different smaller pieces. The apparatus includes a roll having a raised platen circumferentially thereof, and an air distributor to direct heated air against the web on the platen to effect a seal in the area of the platen. The web, with the sealed strips, is moved past a knife that severs the strip, and the knife is heated to prevent the accumulation of material thereon.

1 Claim, 3 Drawing Figures

SLIT SEALING APPARATUS

FIELD OF THE INVENTION

This invention relates generally to plastic sheet sealing and dividing means, and is more particularly concerned with a method and apparatus for dividing a single large tubular member into a plurality of smaller tubular members, commonly known as slit sealing.

BACKGROUND OF THE INVENTION

It is very common in the plastics industry to produce a film of plastic, for example polyethylene, by extruding the plastic material in a tubular shape. In order to achieve the greatest efficiency, the extruders have been made increasingly larger so that the diameter of the extruded tube is quite large. A common means for utilizing these extruded tubular members is to subdivide the large tubular member by flattening the tubular member between pinch rolls, severing the tube longitudinally thereof, and sealing the cut edges to provide a plurality of tubular members. These smaller tubular members can then be cut and sealed transversely to provide a plurality of bags of a reasonably useable size.

The conventional means for carrying out the slitting and sealing operation is through the use of a knife arrangement wherein the knife is heated, and the plastic tubular member is pulled against the sharp edge of the knife, the cut edges then continuing to move in contact with the heated surfaces of the knife member so that the cut edges of the plastic material are melted by the heated knife surfaces, and a bead is rolled at the edge to make a securely sealed edge.

While the prior art slit sealing apparatus has been used reasonably successfully for several years, as the extruders become larger, and the tube is formed faster, the temperature of the knife must be increased in temperature to attempt to form a secure seal and bead in the short length of time the plastic material is riding against the knife. Since polyethylene is basically flamable, it will be understood that an extremely high temperature will tend to burn the material and cause unsightly edges on the product. A lower temperature, with the short dwell times, simply provides for a poor seal which may break under normal use of the final product. One attempt at resolving this problem has been the use of heated air to preheat the plastic material in the area to be slit and sealed so that the subsequent slit sealer can seal more effectively. While such an arrangement may slightly enhance the sealing of the material, such an arrangement will still not assure a good seal at extremely high extruder speeds.

SUMMARY OF THE INVENTION

The present invention overcomes the above mentioned and other difficulties with the prior art slit sealing apparatus by providing fluid means for sealing a longitudinal path of the tubular member coming from the extruder, and heated knife means for severing the sealed path. More specifically, the present invention includes means for heating air or other appropriate fluid, distributor means for distributing the heated air over a portion of the path of travel of the plastic tube in conjunction with platen means for defining the sealed path. Adjacent to the sealing means and located along the sealed-path, there is a knife for severing the sealed path, the knife being heated only sufficiently to prevent an accumulation of plastic residue thereon.

BRIEF DESCRIPTION OF THE DRAWINGS

These and other features and advantages of the present invention will become apparent from consideration of the following specification when taken in conjunction with the accompanying drawings in which.

DESCRIPTION OF THE PREFERRED EMBODIMENT

Figure 1:
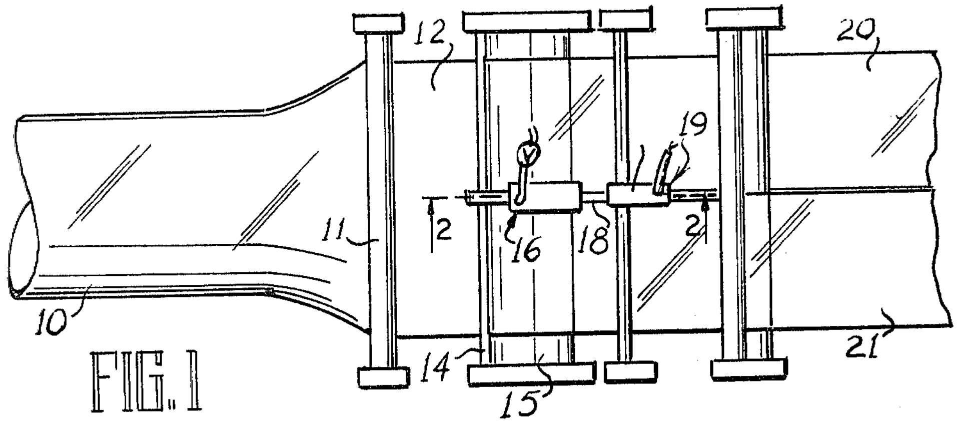
FIG. 1 is a top plan view of a slit sealing apparatus made in accordance with the present invention.

Referring now more particularly to the drawings, and to that embodiment of the invention here chosen by way of illustration, FIG. 1 shows a large tube of material 10 as such material would come from an extruder. Those skilled in the art will realize that the film is extruded as a tube 10, and the tube is filled with air so that portions of the material do not touch other portions of material until the material has cooled sufficiently that no sticking will occur. The tube 10 is then carried to a pair of pinch rolls 11 which flatten the tube 10 into a web 12. This web 12 is fed under a roller 14 which holds the web against a roll 15 where the sealing device generally indicated at 16 seals a path 18, the path 18 comprising a strip along the web 12 wherein the two layers of the web 12 are sealed together. After the sealing apparatus 16 seals the strip, or path 18, a cutting means generally indicated at 19 severs the path 18 to yield two separate tubular members 20 and 21.

Those skilled in the art will realize that, when the members 20 and 21 are separated, some means must be utilized to maintain the severed edges apart until the edges are sufficiently cooled that there is no danger of rejoining. There is here shown a plurality of rollers as are conventional so that the two tubular members 20 and 21 are vertically separated after severing to maintain the desired separation. Also, a crowned roller may be used to effect the required separation.

It should further be understood that the embodiment of the invention here presented by way of illustration shows a single tubular member 10 and a single sealing means 16 and severing means 19 so that two smaller tubular members 20 and 21 are provided. A plurality of sealing means 16, and a plurality of severing means 19, can be easily distributed along the roll 15 and along the web 12 to provide three or more smaller tubular members such as the members 20 and 21. For a given size of tubular members 10, two or more of the sealing and severing means may be used to make smaller diameter tubular members; or, in the event larger tubular members 10 are provided, a plurality of the sealing and severing means may be required to produce the same final sizes of members such as the members 20 and 21.

Figure 2:
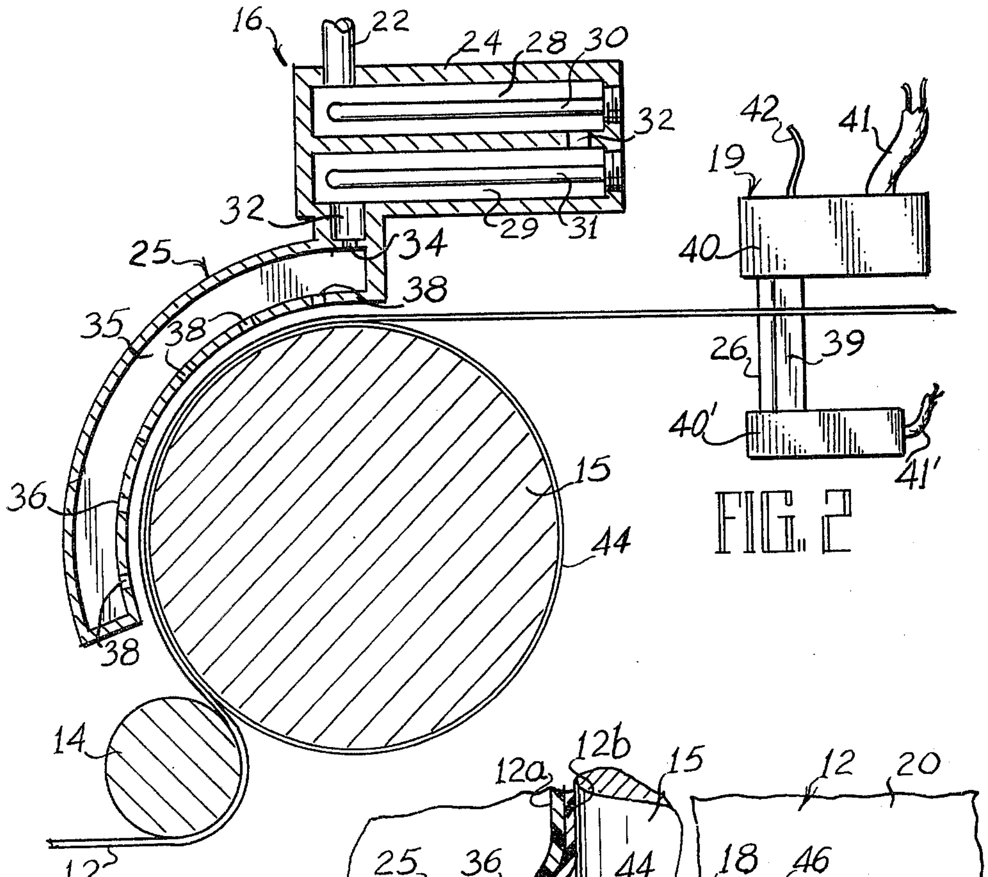
FIG. 2 is an enlarged cross-sectional view taken substantially along the line 2—2 in FIG. 1; and, FIG. 3 is a fragmentary view, partially in cross-section, showing the sealing means made in accordance with the present invention.

Looking now at FIG. 2 of the drawings for a better understanding of the operation of the sealing and severing means of the present invention, it will be seen that the sealing means 16 includes an air inlet 22 which receives air or other gas under pressure, and directs the gas into the heating chamber 24. The air passes from the heating chamber 24 into the fluid distributer 25.

As was previously mentioned, the web 12 passes around the roller 14, and the roller 14 serves to hold the web 12 against a relatively long arc on the surface on the roll 15. Though considerable variation is possible as will be discussed in more detail hereinafter, the distributor 25 covers approximately a 120° arc, and the roller 14 must be placed sufficiently beyond that arc to hold the web 12 in position to be sealed by the fluid distributor 25. The web 12 then leaves the upper point of the roller 15 and extends generally horizontally for a short distance before engaging the cutting edge 26 of the severing means 19.

Returning now to the heating chamber 24, it will be understood that any form of heater to heat air will operate quite well in the present invention. Heaters with heat transfer fins may be used for more efficient heat transfer, and other conventional designs may be used. However, the heating chamber 24 is here shown as including two chambers 28 and 29, each of the chambers 28 and 29 including an electric heating element such as the elements indicated at 30 and 31. The air inlet 22 is shown at one end of the chamber 28, and a connecting passageway 32 is shown at the opposite end of the chamber 28. As a result, air will be received through the inlet 22 and be required to traverse the entire length of the chamber 28 where it is exposed to heat of the electric heater 30; then, the air can pass through the passageway 32 and into the chamber 29 where it must traverse the full length of the chamber 29 in contact with the heating element 31 in order to pass through the outlet 32.

It should be observed that the outlet 32 contains a constriction 34. It has been found that the constriction 34 improves the operation of the device by delaying the air passing from the air inlet 22, through the heater chambers 28 and 29 and into the air distributor 25. If the air is allowed to pass at its normal speed through the heater chambers, the air may not receive enough heat for best operation; however, with the constriction 34 to cause a back pressure, the air is delayed sufficiently that the air can be well heated before being admitted to the fluid distributor 25.

The hot air is admitted into the distributor 25 where the central opening 35 allows the heated air to be immediately distributed throughout the approximately 120° arc. Spaced along the inner wall 36, there is a plurality of apertures 38 through which the air will be directed against the film 12 as it traverses the roll 15.

At this point, it should be understood that the linear speed of the tubular member 10 will vary with different extruders. With any sealing operation, there must be some minimum dwell time. As the dwell time is decreased, the temperature must be increased in order to heat the material sufficiently to allow the desired sealing. In the arrangement shown in FIG. 2 of the drawings, it will be understood that, with a given size of roll 15, the length of the arc covered by the air distributor 25 will vary the dwell time. Of course, the roll 15 can be increased or decreased in size so long as the air distributor 25 can be sufficiently long to give the necessary dwell time.

Attention is now directed to the severing means 19 as shown in FIG. 2 of the drawings. It will here be seen that the severing means 19 includes the knife 39 having the cutting edge 26, the knife 39 being mounted in a block 40 which is heated by an appropriate electrical heating means the electrical line 41 being shown for connection to the heater. Since it is desirable to control the temperature of the block 40, hence the knife 39, the block 40 also includes a temperature sensing means having the lead 42 extending therefrom.

While it is possible to sever the path 18 with a cold but very sharp knife, it has been found that there tends to be an accumulation of plastic material on the sharp edge of the knife, and the use of heat has been found to dissipate this build-up and allow the knife to remain clean for considerable periods of operation. While circular cutters or other means may be used to prevent the build-up of material, the use of a heated knife is both simple and effective.

It has been found that the rapid flow of material across the cutting edge 26 removes a large amount of heat from the cutting edge, so the use of heaters only for the block 40 may not provide the needed quantity of heat in the cutting edge 26. Failure to maintain a high enough temperature in the cutting edge 26 will result in a build-up of material on the edge 26.

To assure that the cutting edge 26 remains hot enough to remain clean, it has been found desirable to pass an electric current through the blade itself. In the embodiment of the invention here illustrated, this is accomplished through the provision of a second block 40' having an electric cable 41' connected thereto. The block 40' is disposed below the web 12 for connection to the lower end of the knife 39. Thus, an electric current can be passed through the knife 39 to maintain the desired temperature.

If desired, of course, the knife 39 can be made in a U-shape so both ends are above the web 12 for easy connection; or, the lower end of the knife 39 may be a removable plug to allow the knife 39 to be removed from the web 12.

It is important to understand at this point that the severing means 19 does not in any way participate in the sealing of the edges of the layers of the material in the web 12. The sealing means 16 provides a complete seal between the layers of the material, and the severing means 19 simply severs the sealed path 18. The heating of the knife 39 is solely to keep the cutting edge 26 of the knife 39 free of build-up. Further, it is desirable to keep the knife 39 thin to prevent any sealing at the knife because there would be a bead rolled at the edge. Such a bead is unnecessary and undesirable.

It will be readily seen that sufficiently hot air blowing against a thermoplastic web will cause some sealing between the separate layers of the web. In a slit sealing arrangement such as that contemplated herein, it is highly desirable to have a discrete sealed area, or path, 18 rather than the somewhat random area that may be achieved by simply a blast of hot air. To achieve this discrete sealed area, it has been found that a platen in conjunction with the carefully controlled heated air will yield a well defined sealed area, or path, 18.

Figure 3:
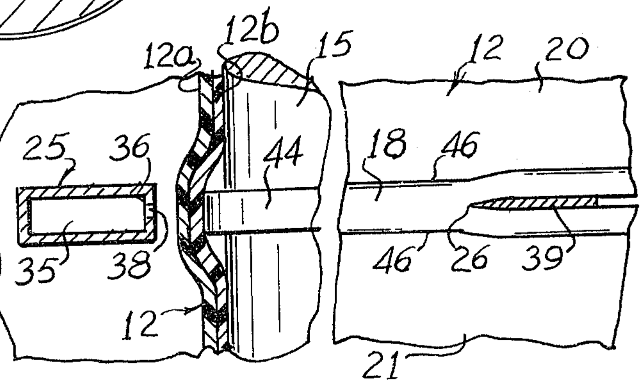

In FIG. 3 of the drawings, it will be seen that the roll 15 has a raised portion, or platen 44 thereon, somewhat as a plateau on the surface of the roll 15. It will be understood that the platen 44 extends completely, circumferentially around the roll 15, and the platen 44 is precisely aligned with the apertures 38 in the distributor 25. As is best shown in FIG. 3, the platen 44 holds the two layers **12*a* and 12*b* away from the roller 15 and towards the apertures 38. With this arrangement, as the heated air is expelled through the apertures 38, the air impinges directly on the web 12, and particularly on the portion of the web 12 that is supported by the platen 44. With such an arrangement, it has been found that there will be a sealed area having precise definition, and as wide as the platen 44**.

While the platen 44 may be formed by numerous means, in one successful embodiment of the invention, it has been found that tape having an adhesive backing can be wrapped around the roll 15 to provide the platen 44. The particular tape used has been approximately ⅛ inch, or about 3 mm wide, and a very neat and well defined sealed area or path 18 has been achieved. It is also contemplated within the scope of the present invention to provide a platen 44 formed integrally with the roll 15. For example, the platen could be machined on the roll 15 when the roll itself is finished. Further, a plurality of platens could be spaced along the roll 15 to make one roll adaptable to a wide variety of slit-sealing operations.

From the foregoing, it will be realized that the height of the platen 44 is not truly critical. If the platen is too small, the sealing will be accomplished but the definition of the edges will not be good; if the platen is too large, the sealing will be accomplished but there will be some distortion of the film. It has been found for general purposes that a platen around 0.010 to 0.015 inch, or 0.2 to 0.5 mm, operates satisfactorily. The foregoing guidelines will allow those skilled in the art to select the particular height desired for any given operation.

FIG. 3 of the drawings also shows a portion of the web 12 after the sealed path 18 has been provided, the path 18 being shown as well defined by discrete sealed edges 46. The knife 39 must then be located between these sealed edges 46 to sever the path 18 generally centrally thereof. It will also be obvious to those skilled in the art that a wider pathway 18 may be provided if greater latitude in severing is required, or a narrower path 18 may be provided if the web can be controlled closely enough for the severing means to sever the middle of the path 18 and provide well sealed edges on both the members.

From the foregoing it should be understood that a tubular member 10 will be directed from a conventional extruder, and the tubular member 10 will be flattened into a web 12 by pinch rolls 11 or the like. The web 12 is then wrapped around a roll such as the roll 15, and heated air is distributed along an arc of the roll 15. The heated air should be heated to a temperature slightly above the melt point of the thermoplastic involved. Polyethylene melts at temperatures from about 185° to about 230° F., or 85° to 110° C., so the temperature of the air should be slightly above these temperatures. Of course the low density and high density polyethylenes vary in the amount of heat required, and precise temperatures must, in any case, be selected for the particular film involved. It is important to note, however, that a further increase in temperature of the air is not particularly effective, but the pressure of the air is important in obtaining a proper seal. In general, around 30 to 40 psig as measured at the entrance 22 to the heater 24 will be effective on polyethylene, and the pressure should be increased in the event a good seal is not obtained.

Once the sealed path 18 has been provided by the sealing means 16, the web 12 passes to the severing means 19. It will be understood that the severing means 19 should be as close as practicable to the sealing means 16 since the sealed path 18 will be easier to sever before the sealed path 18 cools completely. The web 12 is moved by means of the various rollers, and is held as taut as is reasonably possible for maximum control. The blade 39 will be reasonably thin, the object being simple to sever the web, and an extremely thick blade 39 will tend to roll a bead at the edge of the material. Thus, the sharp edge 26 of the knife 39 cuts the sealed path 18, and the heated blade keeps the cutting edge 26 clean and free of build-up. The temperature may be held by means of appropriate temperature control apparatus through the detecting means hereinabove discussed, or the current through the blade can be gradually increased until there is no accumulation of material.

It will therefore be seen that the present invention provides an extremely simple but highly effective method and apparatus for making a longitudinal seal on a multi-layer web, and severing the sealed area. The provision of an effective seal without a rolled bead is desirable both in that the seal is well made and secure, and the absence of a bead at the edge of the material allows the material to be placed into a roll and rolled neatly without the interference of the usual bead.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as defined in the appended claims.

I claim:

1. In apparatus for dividing a thermoplastic tubular member into a plurality of smaller tubular members wherein roller means flatten said tubular member into a web, and means are provided for slitting and sealing said web longitudinally thereof, the improvement comprising means for sealing a path longitudinally of said web, and means for slitting said path, said means for sealing a path including a platen having a width equal to the width of said path, means for holding said web against said platen, and distributor means for directing a heated fluid under pressure against said path while said path is against said platen, said means for slitting said path comprises knife means having a cutting edge, said cutting edge being mounted to be engaged by said path after said path has been sealed, and further including means for heating said knife means, said means for holding said web comprising a roll for receiving said web thereagainst, and a roller for holding said web against said roll, said platen comprising a circumferential plateau on said roll, said distributor means being arcuately shaped to remain adjacent and parallel to said platen.

* * * * *